United States Patent [19]
Muller

[11] 3,718,248
[45] Feb. 27, 1973

[54] ACCUMULATION ROLLER CONVEYOR

[75] Inventor: Donald C. Muller, Whittier, Calif.

[73] Assignee: Jervis B Webb Company, Detroit, Mich.

[22] Filed: Oct. 27, 1971

[21] Appl. No.: 193,095

[52] U.S. Cl. ................................................198/127
[51] Int. Cl. ..............................................B65g 13/02
[58] Field of Search........................................198/127

[56] References Cited

UNITED STATES PATENTS

3,323,636   6/1967   Gotham..............................198/127
3,285,391   11/1966   Fix .....................................198/127

Primary Examiner—Richard E. Aegerter
Assistant Examiner—Joseph E. Valenza
Attorney—Farley, Forster & Farley

[57] ABSTRACT

A conveyor having article carrying rollers arranged in successive groups and an endless driving belt moving below the rollers. Each roller group is independently driven by a drive transmitting unit consisting of one or more driving wheels carried by a frame mounted on a pivotal axis extending longitudinally of the driving belt. Each drive transmitting unit is movable between a driving position in which each driving wheel thereof is rotated by the moving belt and imparts rotation to a pair of adjacent article carrying rollers peripherally engaged by the the driving wheel; and, a non-driving position in which each driving wheel loses engagement with the carrying rollers and a braking force is applied thereto. Electrical or mechanical arrangements control the positions of the drive transmitting units enabling articles to be stopped and accumulated on the groups of rollers and to resume conveying movement in succession, and the direction of article movement is reversible.

18 Claims, 10 Drawing Figures

ACCUMULATION ROLLER CONVEYOR

BACKGROUND OF THE INVENTION

This invention relates to improvements in an accumulation roller conveyor having successive groups of independently driven article carrying rollers, each group containing a sufficient number of rollers to support one of the articles being conveyed, and wherein the drive to each group of rollers can be disengaged enabling articles to successively accumulate behind a stopped article.

Prior examples of conveyors of this general type are found in U.S. Pats. Nos. 3,066,788, 3,225,893 and 3,513,960.

The construction of the invention for a conveyor of this type includes an improved drive transmitting unit which is simple in construction and easily movable between driving and non-driving positions relative to the article carrying rollers. In non-driving position, the drive transmitting unit is capable of exerting a braking force on the article carrying rollers to prevent over travel and pressure build up between successive articles on the conveyor during an accumulation of articles thereon. Also included are optional electrical or mechanical arrangements for controlling the position of the drive transmitting units, these arrangements enabling articles to be stopped and accumulated on the groups of carrying rollers, and released singly for further conveying movement, thus automatically providing a spacing between successive articles on the conveyor.

An accumulation roller conveyor constructed in accordance with the invention has structure supporting a series of article carrying rollers arranged in successive groups and providing an article supporting plane. An endless drive member such as a belt or chain supported on the conveyor structure has a driving reach spaced below the article carrying rollers, and drive transmitting means imparts motion from the endless driven member to each group of article carrying rollers. The drive transmitting means comprises a plurality of units, one for each group of article carrying rollers. Each unit includes a frame, at least one driving wheel rotatably mounted on an axle carried by the frame, and pivot means supporting the frame on the conveyor structure between the article carrying rollers and the driving reach of the endless belt or chain, the pivot means defining an axis which extends longitudinally of the driving reach and parallel to the article supporting plane. A control arrangement for each drive transmitting unit is capable of moving such unit on the pivot means between driving and non-driving positions in which the driving wheel is respectively operable and not operable to transmit motion from the endless driven member to at least one article carrying roller of a group.

Preferably, each driving wheel of a drive transmitting unit is engageable in driving position with the peripheries of a pair of adjacent article carrying rollers, and the axle on which the driving wheel rotates has a floating mounting on the drive transmitting unit frame so that the driving wheel can seek a centered position between the pair of article carrying rollers it engages and properly impart motion simultaneously to each of these carrying rollers.

The frame of the drive transmitting unit is preferably provided with braking pads which engage the peripheries of at least some of the article carrying rollers of a group when the drive transmitting unit is moved to non-driving position.

For heavier duty applications, a chain, instead of a belt, is preferably used for the driving member of the conveyor, and each driving wheel of a drive transmitting unit is secured to a sprocket which engages this chain. In this arrangement, the axis on which the drive transmitting unit pivots is substantially coincident with the longitudinal centerline of the chain so that the sprockets rock on the chain and retain engagement therewith as a drive transmitting unit is pivoted between the driving and non-driving positions.

A preferred electrical arrangement for controlling the positions of the drive transmitting units includes an actuating device such as a solenoid for pivoting each drive transmitting unit. A control circuit for the actuating devices of a conveyor includes a separate connection from a power source to each actuating device, this connection including a contact element operable in response to the presence of an article on the group of article carrying rollers controlled by such actuating device and a second contact element operable in response to the presence of a second article on the next downstream group of article carrying rollers, the contact elements being connected in series. This combination of contact elements is used with the actuating devices for all controlled groups of rollers on the conveyor except the group at the downstream or discharge end of the conveyor, or except the first group of rollers anywhere on the conveyor where an accumulation action is to begin. For a group of this type, only one contact element is employed and is responsive to the presence of an article on the particular group of carrying rollers. The direction of movement of articles on a conveyor employing this electrical type control arrangement is readily reversible.

An alternate mechanical control arrangement, having the same mode of operation as the electrical arrangement, may also be provided, for uni-directional conveyor operation.

Other features and advantages of the invention will appear from the description to follow of the representative embodiments thereof disclosed in the accompanying drawings.

DESCRIPTION OF THE PREFERRED EMBODIMENTS

Figure 1:
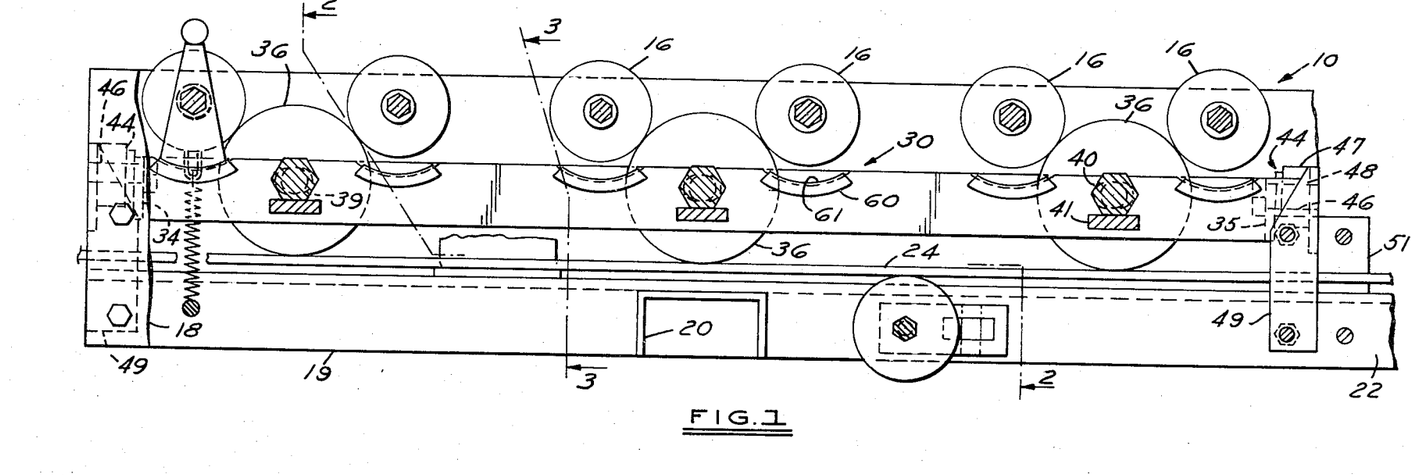
FIG. 1 is a sectional side elevation of a portion of an accumulation roller conveyor taken substantially as indicated by the line 1—1 of FIG. 2, and illustrating one embodiment of the invention.
Figure 2:
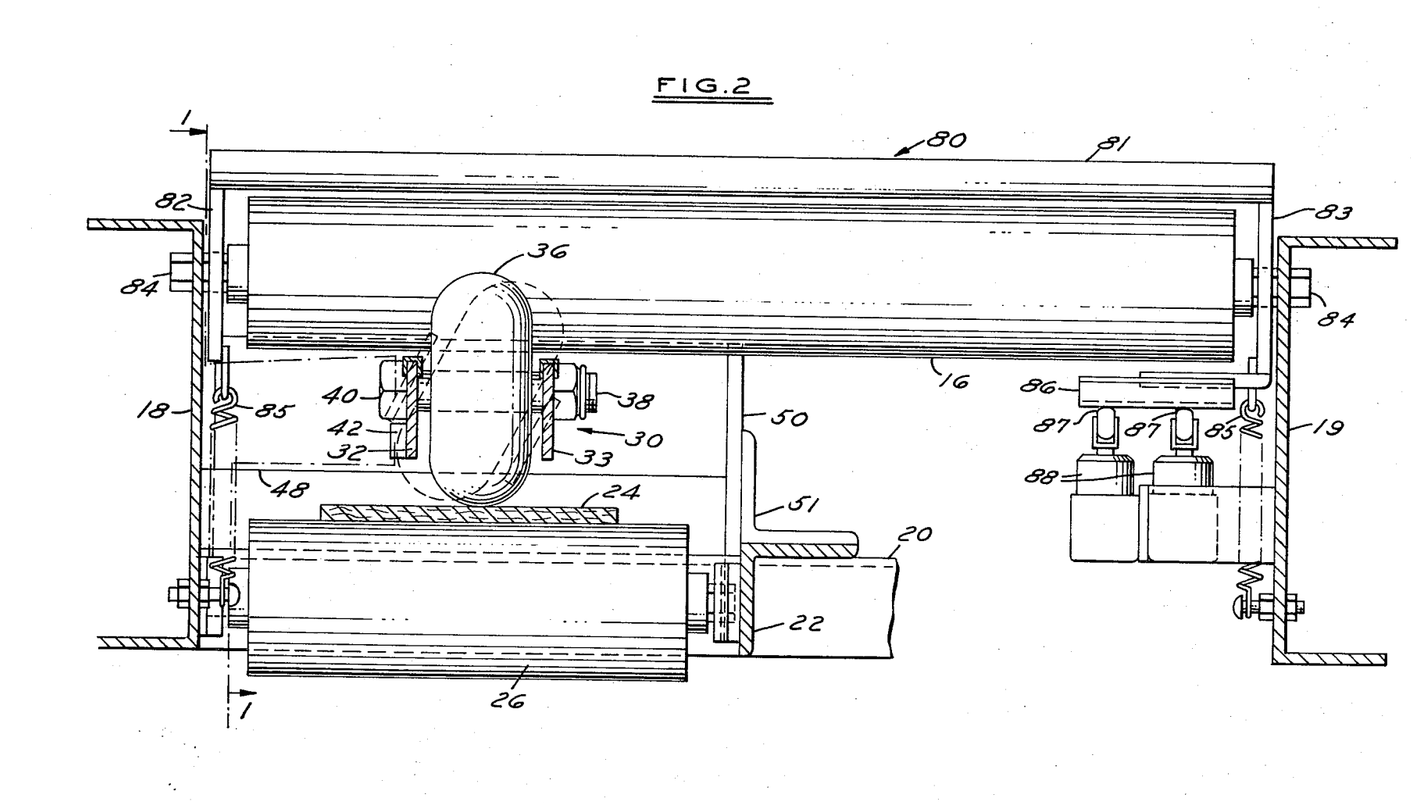
FIG. 2 is a transverse sectional elevation of the conveyor construction of FIG. 1, taken as indicated by the line 2—2 thereon.
Figure 3:
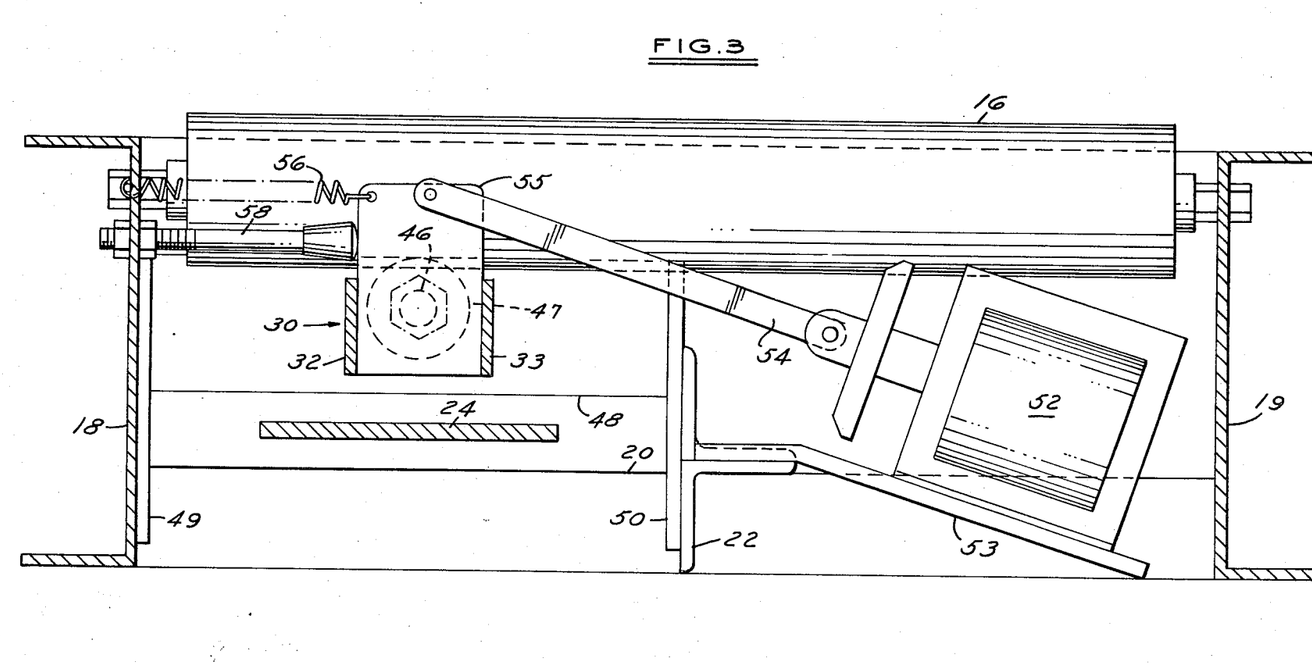
FIG. 3 is a transverse sectional elevation taken as indicated by the line 3—3 of FIG. 1.
Figure 4:
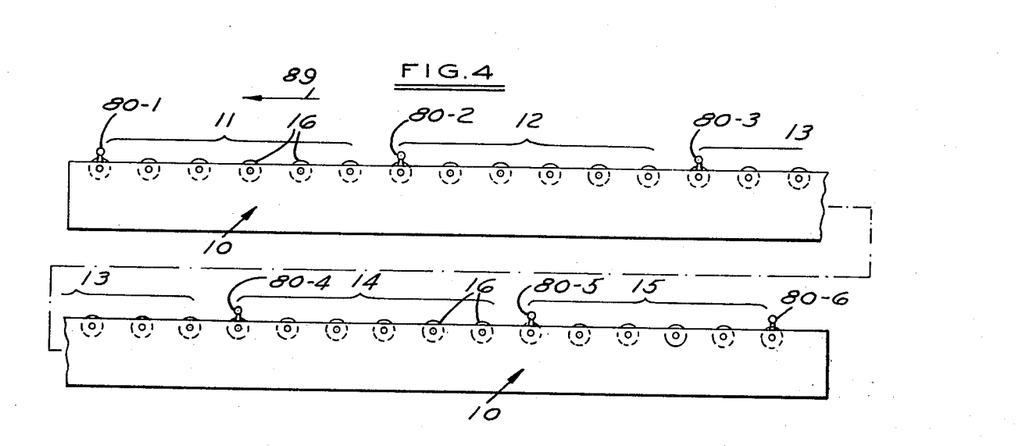
FIG. 4 is a schematic side elevation of an accumulation conveyor constructed in accordance with FIGS. 1-3.

Referring to FIGS. 1–4, an accumulation roller conveyor 10 of the invention has a series of article carrying rollers arranged in successive groups 11, 12, 13, 14 and 15, as shown in FIG. 4. The construction of the conveyor for one of these groups 11 is shown in FIGS. 1–3, it being understood that this construction is duplicated for each of the other groups.

In FIGS. 1–3, the conveyor 10 includes suitable structure for supporting the article carrying rollers 16, including side members 18 and 19 connected together at suitable intervals by transverse members 20. The article supporting rollers 16 are mounted between the side members 18 and 19 and provide an article supporting plane. This conveyor structure also includes a longitudinal member 22 positioned between the side members 18 and 19 and connected to the transverse members 20. As shown in FIGS. 2 and 3, the driving reach of an endless driven belt 24 is supported on a series of idler rollers 26 mounted between the side member 18 and longitudinal member 22 of the conveyor structure, this driving reach being spaced below the article carrying rollers 16, and motion of the belt 24 is imparted to each group of article carrying rollers by drive transmitting unit 30.

Each drive transmitting unit 30 includes a frame having a pair of transversely spaced side members 32 and 33 secured to end members 34 and 35. A suitable number of driving wheels 36 are carried by the frame for the number of article carrying rollers in a group, each driving wheel being preferably arranged to impart motion to an adjacent pair of article carrying rollers, as shown in FIG. 1. Each driving wheel 36 is positioned between the frame side members 32 and 33 and is rotatably mounted on an axle 38 which slidably engages elongated slots 39 in each of the frame members 32 and 33 and which is restrained against rotation by engagement between a hex-shaped end 40 on the axle and a fixed abutment formed by individual blocks 41 or a larger continuous bar 42 (FIG. 2) on the frame side member 32.

Pivot means 44 supports the drive transmitting unit 30 on the conveyor structure, the pivot means 44 defining an axis which extends longitudinally of the driving reach of the belt 24 and parallel to the article supporting plane defined by the carrying rollers 16. The pivot means 44 includes a pivot pin 46 secured to each of the end members 34 and 35 of the drive unit frame, each pivot pin 46 engaging a bearing 47. Each bearing 47, as best shown in FIGS. 1 and 3 is carried by a bracket consisting of a cross member 48 secured to an upright member 49 attached to the side member 18 and another upright member 50 attached to the longitudinal member 42 and to an angle support secured thereto. In the construction of FIGS. 1–3, the axis defined by the pivot means 44 extends through the transverse centers of the driving wheels 36, as best shown in FIGS. 2 and 3, and the drive transmitting unit 30 is movable on the pivot means 44 between driving and non-driving positions in which the driving wheels of the unit are respectively operable and not operable to transmit motion from the belt 24 to the article carrying rollers of a group.

Suitable control means capable of moving each drive transmitting unit of a conveyor between such driving and non-driving positions will be hereinafter described in detail, and may be primarily electrical or primarily mechanical in nature. Such control means in the construction of FIGS. 1–4 include a power actuated device such as the solenoid 52 shown in FIG. 3, (or a fluid pressure unit) which is mounted on a bracket 53 supported by the conveyor structure and connected by a link 54 to an arm 55 secured between the frame members 32 and 33 of a drive transmitting unit 30. A spring 56 is connected to the arm 55 and to the conveyor side member 18, and this spring, or the abutment bar 42 biases the unit 30 to driving position in which the arm 55 abuts a stop 58 carried by the side member 18. Actuation of the solenoid 52 pivots the unit 30 to non-driving position in which the driving wheels 36 of the unit lose contact with either the surface of the belt 24 or the peripheries of the article carrying rollers 16, or both.

Each drive transmitting unit 30 preferably includes braking means engageable with the peripheries of the article carrying rollers 16 in the nondriving position of the unit. Such braking means are best shown in FIG. 1 and comprise brake pads 60, each mounted in an arcuate recess formed in the frame members 32 of the drive transmitting unit, each brake pad 60 having an arcuate braking surface 61 conforming to a portion of the periphery of an article carrying roller 16.

Figure 6:
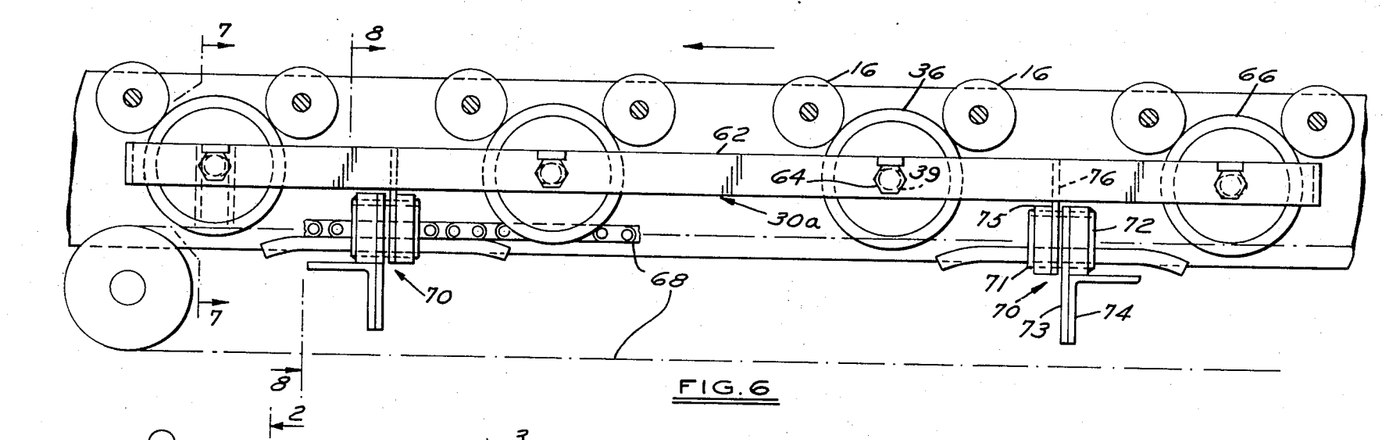
FIG. 6 is a sectional side elevation similar to FIG. 1, but showing an alternate form of construction.
Figure 7:
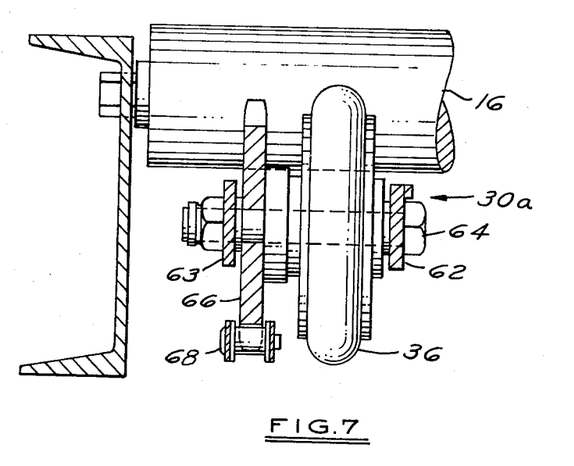
FIG. 7 is an enlarged transverse sectional detail taken as indicated by the line 7—7 of FIG. 6.
Figure 8:
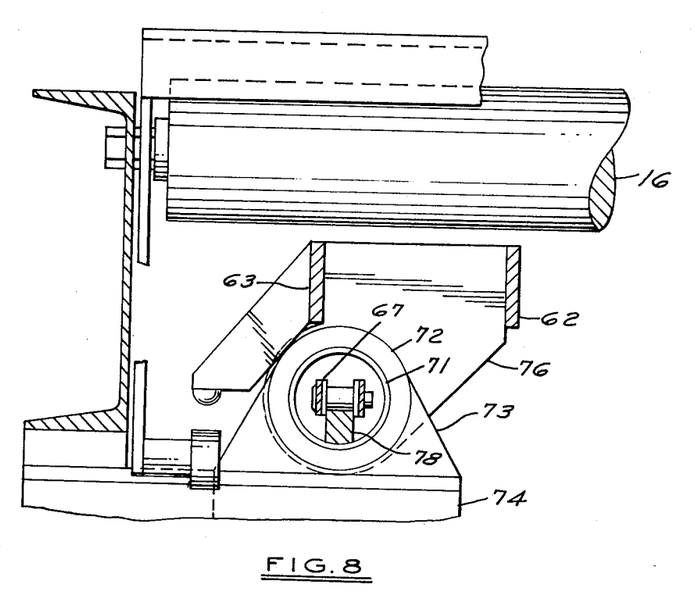
FIG. 8 is an enlarged transverse sectional detail taken as indicated by the line 8—8 of FIG. 6.

An alternate, heavier duty form of conveyor and drive transmitting unit construction is shown in FIGS. 6–8 wherein similar parts are designated by the same reference numbers used in the preceeding description.

A drive transmitting unit 30a in this construction includes a frame having side members 62 and 63 between which a suitable number of driving wheels 36 are mounted. Each driving wheel rotates on an axle 64 received in longitudinal slotted apertures in the frame side members 62 and 63 as in the previously described construction, and is coupled to a sprocket 66 which engages the driving reach of an endless driven roller chain 68.

Pivot means 70 support the drive transmitting unit 30a for movement on an axis which is substantially coincident with the longitudinal centerline of the chain 68 on the driving reach thereof. Each pivot means 70 consists of a cylindrical tubular sleeve 71 connected by a collar 72 to a bracket 73 attached to a transverse member 74 forming part of the conveyor structure, and the sleeve 71 is rotatably engaged by a collar 75 connected to a bracket 76 mounted between the side members 62 and 63 of the drive transmitting unit frame, as shown in FIG. 8. A chain guide 78 is mounted within and secured to the sleeve 71 and positions the longitudinal centerline of the driving reach of the chain 68 substantially coincident with the longitudinal axis of the cylindrical sleeve 71 which in turn defines the axis of the pivot means.

The drive transmitting unit 30a is movable on the pivot means 70 between driving and non-driving positions, the driving position being shown in FIGS. 6–8. In non-driving position, the driving wheel 36 moves out of engagement with the periphery of the article carrying rollers, but the sprocket 66 however remains in engagement with the driving reach of the chain, and a relatively lesser degree of angular movement is required between the driving and non-driving positions of the drive transmitting unit 30a than in previously described constructions. A spring 56 can be provided to move the drive transmitting unit 30a to driving position as shown in FIG. 3, with the driving position being defined by a stop 58. Movement of the drive transmitting unit 30a to non-driving position results from the operation of electric or mechanical control means.

Figure 5:
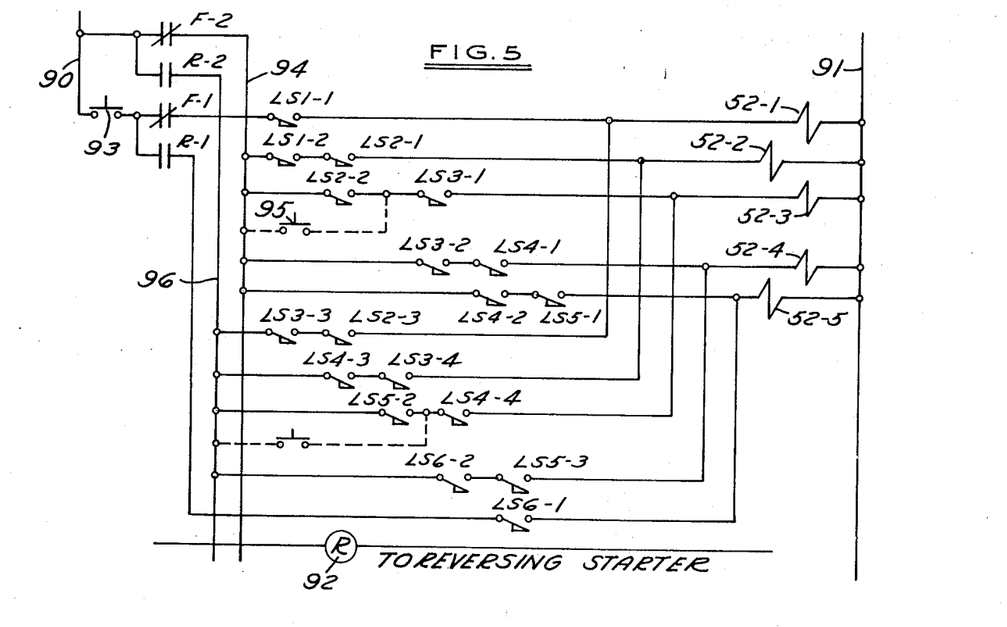
FIG. 5 is a schematic circuit diagram illustrating the arrangement of control components for the conveyor of FIG. 4.

Such control means of an electric nature are illustrated in FIGS. 4 and 5, and enable articles to be moved along the conveyor in either direction, to accumulate from either end of the conveyor, depending upon the direction of movement, and to accumulate at other positions on the conveyor as desired. Each of the groups of article carrying rollers 11–15, shown in FIG. 4, has an article sensing device 80 associated therewith, these devices being labeled 80–1 through 80–6. One of these sensing devices 80 is shown in FIG. 2, and consists of a bar 81 normally projecting above the article supporting plane defined by the article carrying rollers 16 and mounted between a pair of arms 82 and 83 which are freely pivoted on the axle 84 of an article carrying roller 16. A spring 85 is connected between the conveyor structure and the lower end of each of the arms 82 and 83 so that the arms and bar are biased to an upright position. In this position, a cam 86 secured to the arm 83 engages the follower elements 87 of limit switches 88 and retains the contacts of these limit switches in a normally open position. The cam 86 is not concentric with the axis on which the arm 83 pivots, and hence when the bar 81 is engaged by an article, the ensuing movement of the cam 86 will result in a change in position of the contacts of the limit switches 88.

A control circuit diagram is shown in FIG. 5, including the contacts of the limit switches 88. In this diagram, an actuating device such as the solenoid 52 for moving the drive transmitting unit of each group of rollers 11–15 is designated 51–1 through 52–5, respectively. This circuit has a power source indicated by power lines 90 and 91 and alternate forward and reverse connections to each of the actuating devices through forward contacts F–1 and F–2 or reverse contacts R–1 and R–2 of a relay 92 arranged in a reversing starter circuit for the motor (not shown) which drives the belt 24 or the chain 68. The limit switch contacts operated by the sensing devices 80–1 through 80–6 are designated by the dash number of the sensing device with which each limit switch is associated; for example, all "LSI" contacts are operated by the sensing device 80–1, all "LS2" contacts are operated by the sensing device 80–2, and so on. The circuit is shown in FIG. 5 with the forward relay contacts F–1 and F–2 in closed condition, which corresponds with article movement along the conveyor in the direction of the arrow 89 in FIG. 4. In this direction of movement, the sensing device 80–1 is located at the downstream or discharge end of the conveyor.

The actuating device 52–1 at the downstream end of the conveyor is connected to the power source through a limit switch contact LS1–1, the relay contact F–1 and a switch 93. Each of the other actuating devices 52–2 through 52–5 is separately connected to a line 94 leading to the power source through the relay contact F–2, and each of these separate connections includes a limit switch contact operable in response to the presence of an article on the group of article carrying rollers controlled by such actuating device and a second limit switch contact operable in response to the presence of a second article on the next downstream group of article carrying rollers. For example, the solenoid or actuating device 52–2 for the second group of article carrying rollers 12 is connected to line 94 through a limit switch contact LS2–1 operated by the sensing device 80–2, and through a second limit switch contact LS1–2 operated by the sensing device 80–1, the switch contacts LS2–1 and LS1–2 being arranged in series.

Operation of the conveyor to advance articles in the direction of the arrow 89 is as follows, referring to FIGS. 4 and 5:

When the switch 93 is open, articles are advanced along the carrying rollers 16 continuously, maintaining a spacing between each successive article at least equal to the spacing between the successive sensing devices 80–1 through 80–5. If this spacing is decreased — for example if an article were placed on the upstream group of rollers 15 and engaged the sensing device 80–5 while the next preceeding article still engaged the sensing device 80–4, the limit switch contacts LS5–1 and LS4–2 operated by the respective sensing devices 80–5 and 80–4 would be closed, completing a circuit from the line 94 through the actuating device 52–5. As a result, the drive transmitting unit of the group of rollers 15 would be moved to non-driving position and retained therein by the actuating device 52–5 until the next preceeding article had cleared the sensing device 80–4.

When the switch 93 is closed, the first article which thereafter engages the sensing device 80–1 comes to a stop as a result of the actuating device 52–1 being energized through the LS1–1 contact and moving the drive transmitting unit for the group of carrying rollers 11 to non-driving position. As long as the sensing device 80–1 is depressed by the presence of a first article thereon, the next succeeding or second article will cone to a stop when it engages the sensing device 80–2 of the second group of rollers 12 because a circuit is then completed through the switch contacts LS2–1 and LS1–2 to the actuating device 52–2 for the drive transmitting unit of the second group of rollers 12. Any articles following the second article will successively accumulate on the groups of rollers 13, 14 and 15 as a result of a similar energization of the actuating devices 52–3, 52–4 and 52–5 for such successive groups. It is to be noted that the circuit from the line 94 to each of the actuating devices 52–2 through 52–5 includes a pair of limit switch contact elements arranged in series, one of which contact elements is operated by the sensing device of that group of rollers and the other of which is operated by the sensing device of the next downstream group of rollers.

When the article on the downstream group of rollers is moved, either manually or by opening the switch 93 to return the drive transmitting unit of the first group of rollers 11 the driving position, movement of the article on the second group of rollers 12 does not resume until the article on the first groups clears the first group sensing device 80-1. Likewise, any following articles accumulated on the upstream groups of rollers each do not move until the preceeding article has cleared the sensing device of the next downstream group. In other words, when articles are accumulated on the conveyor, they resume movement one by one and a spacing between successive articles is established approximately equal to the longitudinal distance between successive sensing devices 80. Articles accumulate without creating any pressure build-up therebetween and resume forward movement with a singulating flow which automatically creates a gap between successive articles necessary for negotiating any curves in the conveyor, or for convenience in the handling of individual articles along the conveyor. This singulating action reduces the power requirement for driving the belt 24 or chain 68.

In FIG. 5, a switch 95 is shown for establishing an optional connection between the actuating device 52-3 and the power line 94 through the switch contact LS3-1. When this switch 95 is closed, an article contacting the sensing device 80-3 will stop and following articles will accumulate. Such a switch 95 can of course be installed at any location desired along the conveyor and in connection with any desired group of rollers.

If the direction of movement of the belt 24 or chain 68 is reversed, the condition of the contacts of the relay 92 is also automatically reversed and contacts R-1 and R-2 become closed while the forward contacts F-1 and F-2 open. The group of rollers 15 now become the group at the downstream end of the conveyor and are controlled by a connection from the power line 90 through the relay contact R-1 and a switch contact LS6-1 operated by the sensing device 80-6. The actuating device for each group of rollers other than the group 15 at the downstream end are each operated by a separate connection to the power source through line 96 and the relay contact R-2. As before, each of these separate connections includes a switch contact operated by the sensing device of the group being controlled and the sensing device of the next downstream group. The operation of the conveyor in reverse is identical to that previously described for the forward direction.

Figure 9:
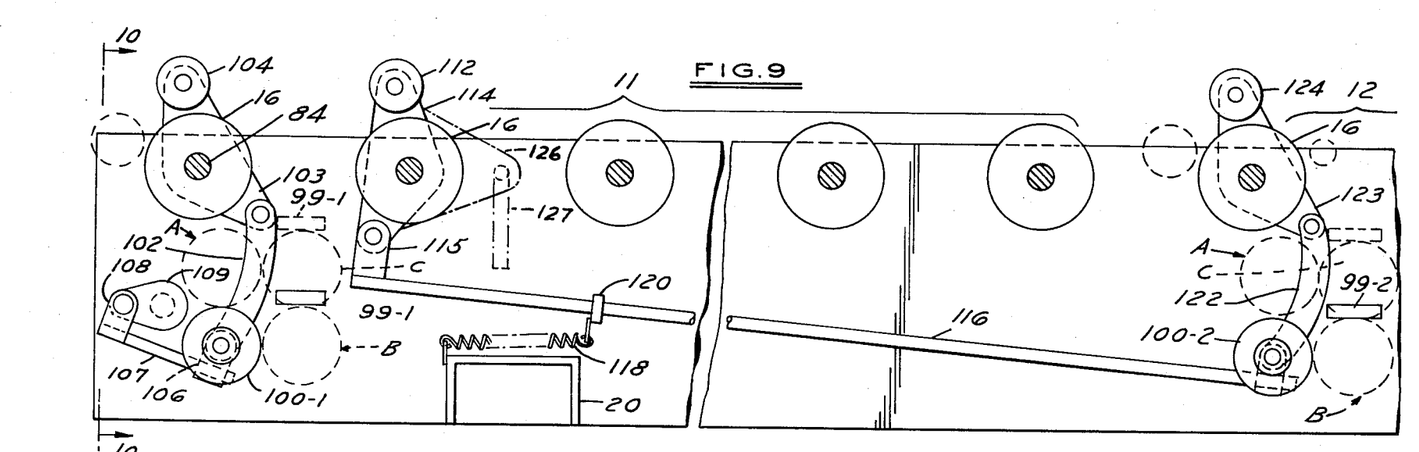
FIG. 9 is a sectional side elevation illustrating a mechanical control arrangement; and, FIG. 10 is a sectional detail taken as indicated by the line 10—10 of FIG. 9.
Figure 10:
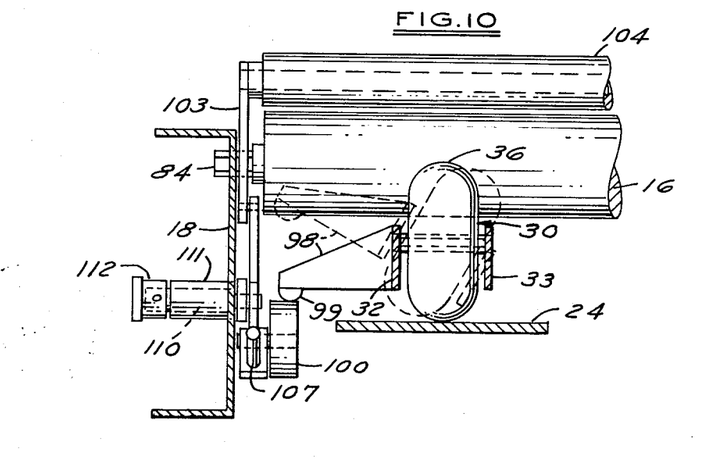

FIGS. 9 and 10 illustrate a mechanical control arrangement which enables the conveyor to be operated in a manner similar to that obtained with the electrical control described above, except for the reversing feature. FIG. 9 illustrates the elements of this mechanical control associated with the last group of rollers 11 at the downstream end of the conveyor and with the last carrying roller 16 at the downstream end of the next group of rollers 12. The drive transmitting unit of each group of rollers has a laterally projecting arm or control member 98 secured to the frame member 32 thereof, as shown in FIG. 10, the arm 98 supporting a cam bar 99 which is engageable by a mechanically operated actuator roller 100 to move the drive transmitting unit 30 from driving to non-driving position.

At the downstream group of rollers 11, the actuator roller 100-1 is supported by a link 102 pivotally connected to a bell crank 103 which is rotatably mounted on the axle 84 of the last carrying roller 16, the bell crank 103 including an upwardly projecting portion which supports an article sensing bar 104. The other end of the sensing bar 104 is supported by another member rotatably mounted on the other end of the axle 84, in a manner similar to that illustrated in FIG. 2 for the sensing bar 81. The actuator roller 100-1 is also pivotally connected to a bracket 106 supporting a positioning rod 107 which in turn is pivotally connected by another bracket 108 to a member 109 of an accumulation control having accumulating and non-accumulating positions. The member 109 is secured to a shaft 110 which projects outwardly through a journal 111 supported on the conveyor side member and is secured to a control knob 112.

When the member 109 is in the non-accumulating position shown in FIG. 9, an article contacting the sensing bar 104 causes the bell crank 103 to rotate and the actuator roller 100-1 moves upwardly from the full line position shown to the broken line position designated A and does not contact the cam bar 99. The drive transmitting unit 30 for the group of rollers 11 thus remains in driving position.

A 180° rotation of the control knob 112 in a counter-clockwise direction moves the actuator roller 100-1 from the full line position shown to the broken line accumulating position designated B in which the actuator roller 100-1 underlies the cam bar 99-1. When an article now contacts the sensing bar 104, rotation of the bell crank 103 causes the actuator roller 100-1 to move from position B to the broken line position C, moving the cam bar 99-1 upwardly and pivoting the drive transmitting unit 30 to the non-driving position shown in broken line in FIG. 10. The article on the group of rollers 11 consequently stops. The stopped article also engages a second sensing bar 112 carried by bell cranks 114 rotatable on the axle of the second last roller 16 of the group 11, one of the bell cranks 114 being pivotally connected to a bracket 115 attached to an actuating rod 116 connected to the actuator roller 100-2 for the group of rollers 12. A return spring 118 is mounted between a cross member 20 of the conveyor structure and a collar 120 fastened to the actuator rod 116; or alternately, the bell cranks 114 may be provided with arms 126 between which a counterweight 127 is pivotally suspended, as shown in dot-dash line, giving more positive and precise control over the return force. When the sensing bar 112 is depressed by an article, the actuator roller 100-2 is moved from the full line position shown to position B in which it underlies the cam bar 99-2 of the drive transmitting unit for the second group of rollers 12. The actuator roller 100-2 is connected by a link 122 to a bell crank 123 supporting a sensing bar 124 for the group of rollers 12. When the sensing bar 124 is depressed by an article with the actuator roller 100-2 in position B, the ensuing upward movement of the actuator roller to position C moves the drive transmitting unit of the second group of rollers to non-driving position. If the sensing bar 112 associated with the downstream group of rollers 11 is not engaged by an article, engagement of the next upstream sensing bar 124 merely results in movement of the actuator roller 100-2 from the full line position shown to position A with no effect upon the driving action of the drive transmitting unit for the group of rollers 12.

It will be understood that the sensing bars 112 and 124 and the parts associated therewith will be repeated for each ensuing controlled group of rollers on the conveyor.

Operation of the conveyor by this mechanical control is similar to the unidirectional operation of the electrical control. When the member 109 operated by the control knob 112 is in the full line, non-accumulating position, articles on the conveyor are continually advanced and a spacing between adjacent articles is automatically maintained, this spacing being approximately equal to the distance along the conveyor between the sensing bars 112 and 124. These sensing bars will ordinarily be spaced apart a distance substantially equal to the length of the longest article being handled; however, a shorter distance may be possible where an article can be satisfactorily driven by less than the complete number of carrying rollers which the article engages at one time.

When the crank 109 is rotated to the 180° accumulating position which places the actuator roller 100–1 in position B of FIG. 9, articles then accumulate on the conveyor, and this accumulation action for each group of rollers is controlled by two sensing devices, one responsive to the presence of an article on the controlled group and the other responsive to the presence of an article on the next group downstream. Accumulation of articles takes place without any pressure buildup between adjacent articles, and the resumption of article movement after accumulation results in automatically creating a space between successive articles which is substantially equal to the distance between each inter-connected pair of sensing bars 112 and 124.

The mechanical control linkage illustrated is relatively simple and does not require any great degree of precision for proper operation. Also, the ease with which a drive transmitting unit 30 can be pivoted from driving to non-driving position enables such a mechanical linkage to be successfully employed even on conveyors for light duty service.

I claim:

1. An accumulation roller conveyor having structure supporting a series of article carrying rollers arranged in successive groups and providing an article supporting plane, an endless driven member supported on the conveyor structure and having a driving reach spaced below the article carrying rollers, and drive transmitting means for imparting motion from the endless driven member to each group of article carrying rollers, wherein:

the drive transmitting means includes a plurality of units, one for each controlled group of article carrying rollers, each unit including a frame, at least one driving wheel rotatably mounted on an axle carried by the frame, and pivot means supporting the frame on the conveyor structure between the article carrying rollers and the driving reach of the endless driven member, said pivot means defining an axis which extends longitudinally of the driving reach of the endless driven member and parallel to the article supporting plane; and control means for each drive transmitting unit are capable of moving such unit on said pivot means between driving and non-driving positions in which the driving wheel is respectively operable and not operable to transmit motion from the endless driven member to at least one article carrying roller of a group.

2. An accumulation roller conveyor according to claim 1 wherein at least one driving wheel of a drive transmitting unit is engageable in the driving position with the peripheries of an adjacent pair of article carrying rollers of a group, and the axle mounting such driving wheel is carried by the frame for limited floating movement longitudinally thereof whereby such driving wheel can move to a centered position relative to said pair of article carrying rollers when the drive transmitting unit is in driving position.

3. An accumulation roller conveyor according to claim 1 wherein drive transmitting unit includes braking means engageable in the non-driving position with the periphery of an article carrying roller.

4. An accumulation roller conveyor according to claim 3 wherein the control means includes a power actuated device for moving the drive transmitting unit to the non-driving position.

5. An accumulation roller conveyor according to claim 1 wherein the frame of a drive transmitting unit includes a pair of transversely spaced frame members, the driving wheel being positioned between said frame members and being engageable in the driving position with the peripheries of a pair of adjacent article carrying rollers, and the axle on which the driving wheel is mounted is carried by said frame members for limited floating movement in directions transverse to the axes of the pair of article carrying rollers.

6. An accumulation roller conveyor according to claim 1 wherein the frame of a drive transmitting unit includes a pair of transversely spaced frame members, and a plurality of driving wheels positioned between the frame members at longitudinally spaced intervals, each driving wheel in the driving position engaging the peripheries of an adjacent pair of article carrying rollers of a group.

7. An accumulation roller conveyor according to claim 6 wherein the axle on which each driving wheel is rotatably mounted slidably engages longitudinally slotted apertures in the pair of frame members to permit movement of such driving wheel into a centered position relative to the pair of article carrying rollers engaged thereby.

8. An accumulation roller conveyor according to claim 6 wherein one of the pair of frame members is provided with braking means engageable with at least some of the article carrying rollers of a group in the non-driving position of the drive transmitting unit.

9. An accumulation conveyor according to claim 8 wherein the braking means includes a brake pad having a braking surface engageable with the periphery of an article carrying roller.

10. An accumulation roller conveyor according to claim 9 wherein the control means includes a power actuated device for moving the drive transmitting unit to the non-driving position.

11. An accumulation roller conveyor according to claim 1 wherein the endless driven member is a chain, a sprocket is connected to each driving wheel and engages the driving reach of the chain, and the axis defined by the pivot means supporting a drive unit frame is substantially coincident with the longitudinal centerline of the chain on the driving reach thereof.

12. An accumulation conveyor according to claim 11 wherein said pivot means includes a cylindrical tubular member through which the driving reach of the chain passes.

13. An accumulation conveyor according to claim 12 wherein said cylindrical tubular member is fixed to the conveyor structure and a chain guide mounted within the tubular member positions the longitudinal centerline of the chain substantially coincident with the longitudinal axis of said cylindrical tubular member which defines the axis of the pivot means.

14. An accumulation conveyor according to claim 1 wherein the control means includes a control circuit having a power source,
   an actuating device for the drive transmitting unit of each controlled group of article carrying rollers,
   a separate connection from the power source to each actuating device, said connection including a contact element operable in response to the presence of an article on the group of article carrying rollers controlled by such actuating device, said connection to the actuating device for each controlled group of article carrying rollers other than a controlled group at the downstream end of the conveyor including a second contact element operable in response to the presence of a second article on the next downstream group of article carrying rollers, said second contact element being arranged in series with the first contact element.

15. An accumulation conveyor according to claim 14 wherein the control circuit includes an alternate separate connection from the power source to each actuating device, said alternate connection including a third contact element operable in response to the presence of an article on the next upstream group of rollers, said third contact element being arranged in series with the first contact element, and means for operating each actuating device through said alternate connection in response to a reversal of the direction of movement of the endless driven member.

16. An accumulation conveyor according to claim 1 wherein the control means for each drive transmitting unit other than the drive transmitting unit for a controlled group of article carrying rollers at the downstream end of the conveyor includes a pair of article sensing devices one of which is operable in response to the presence of an article on the group of article carrying rollers driven by such drive transmitting unit and the second of which is operable in response to the presence of a second article on the next downstream group of article carrying rollers, the pair of sensing devices for each drive transmitting unit being separate from the pair of sensing devices for each other drive transmitting unit.

17. An accumulation conveyor according to claim 1 wherein the control means for each drive transmitting unit other than the drive transmitting unit for a controlled group of article carrying rollers at the downstream end of the conveyor includes a control member secured to the drive transmitting unit frame, an article sensing member movable in response to the presence of an article on the group of article carrying rollers driven by such drive transmitting unit, a second article sensing member movable in response to the presence of a second article on the next downstream group of article carrying rollers, and linkage means for causing the control member to move the drive transmitting unit to non-driving position in response to movement of the first and second article sensing members.

18. An accumulation conveyor according to claim 17 wherein the control means for a drive transmitting unit for a controlled group of article carrying rollers at the downstream end of the conveyor includes a control member secured to the drive transmitting unit frame of such group, a downstream group article sensing member movable in response to the presence of an article on such group, an accumulation control movably carried by the conveyor structure and having accumulating and non-accumulating positions, and means operable in the accumulating position of the accumulation control for causing the control member to move the drive transmitting unit to non-driving position in response to movement of the downstream group article sensing member.

* * * * *